(12) United States Patent
Shan et al.

(10) Patent No.: US 8,989,756 B2
(45) Date of Patent: Mar. 24, 2015

(54) METHOD AND APPARATUS FOR TRANSMITTING DOWNLINK CONTROL INFORMATION FOR RESOURCE ALLOCATION IN A WIRELESS COMMUNICATION SYSTEM

(71) Applicant: Samsung Electronics Co., Ltd., Gyeonggi-do (KR)

(72) Inventors: Cheng Shan, Gyeonggi-do (KR); Jin Kyu Han, Seoul (KR); Youn Sun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/269,369

(22) Filed: May 5, 2014

(65) Prior Publication Data

US 2014/0241287 A1 Aug. 28, 2014

Related U.S. Application Data

(63) Continuation of application No. 13/073,516, filed on Mar. 28, 2011, now Pat. No. 8,718,662.

(60) Provisional application No. 61/317,981, filed on Mar. 26, 2010, provisional application No. 61/323,071, filed on Apr. 12, 2010, provisional application No. 61/372,300, filed on Aug. 10, 2010, provisional application No. 61/380,907, filed on Sep. 8, 2010.

(51) Int. Cl.
*H04W 72/00* (2009.01)
*H04W 72/04* (2009.01)
*H04L 5/00* (2006.01)

(52) U.S. Cl.
CPC .......... *H04W 72/042* (2013.01); *H04L 5/0091* (2013.01); *H04L 5/0007* (2013.01)
USPC ........ 455/450; 455/451; 455/452.1; 455/453; 455/454; 455/455; 370/310; 370/322; 370/328; 370/329; 370/330

(58) Field of Classification Search
USPC .......... 455/450–455; 370/310, 322, 328–330
See application file for complete search history.

(56) References Cited

U.S. PATENT DOCUMENTS

| | | | |
|---|---|---|---|
| 8,718,662 B2 * | 5/2014 | Shan et al. ............. | 455/450 |
| 2011/0019776 A1 * | 1/2011 | Zhang et al. ........... | 375/340 |
| 2011/0243066 A1 * | 10/2011 | Nayeb Nazar et al. ..... | 370/328 |
| 2013/0021991 A1 * | 1/2013 | Ko et al. ............... | 370/329 |

* cited by examiner

*Primary Examiner* — Fayyaz Alam
(74) *Attorney, Agent, or Firm* — The Farrell Law Firm, P.C.

(57) ABSTRACT

A method and apparatus for transmitting and receiving Downlink Control Information (DCI) in a wireless communication system. A method for transmitting DCI by a base station includes generating the DCI including at least one of a data format indicator for at least one Transport Block (TB), and a DeModulation Reference Signal (DMRS) resource allocation indicator corresponding to the at least one TB; and sending the DCI to a terminal. The DMRS resource allocation indicator includes a rank pattern for the at least one TB, an allocated scrambling code type, and DMRS port information.

24 Claims, 5 Drawing Sheets

METHOD AND APPARATUS FOR TRANSMITTING DOWNLINK CONTROL INFORMATION FOR RESOURCE ALLOCATION IN A WIRELESS COMMUNICATION SYSTEM

PRIORITY

This application is a Continuation of U.S. application Ser. No. 13/073,516, which was filed in the U.S. Patent and Trademark Office on Mar. 28, 2011, and claims priority under 35 U.S.C. §119(e) to U.S. Provisional Application Nos. 61/317,981, 61/323,071, 61/372,300, and 61/380,907, which were filed in the U.S. Patent and Trademark Office on Mar. 26, 2010, Apr. 12, 2010, Aug. 10, 2010, and Sep. 8, 2010, respectively, the content of each of which is incorporated herein by reference.

BACKGROUND OF THE INVENTION

1. Field of the Invention

The present invention relates generally to a cellular communication system and, more particularly, to a method and apparatus for transmitting downlink control information in an Orthogonal Frequency Division Multiple Access (OFDMA) communication system in which radio resources are allocated in units of Resource Blocks (RBs).

2. Description of the Related Art

With the advance of mobile communication technologies, mobile communication systems have evolved to support high speed data communication services as well as the standard voice communication services. However, there is still a need for a more sophisticated mobile communication system that mitigates resource shortages and meets the varying high-speed service requirements of subscribers.

Typically, in a cellular communication system, a base station sends scheduling information about data to be transmitted to a User Equipment (UE) with Downlink Control Information (DCI). There are various DCI formats defined for indicating whether the information is uplink scheduling information or downlink scheduling information, whether the information is compact DCI, or whether the information is for multiple antenna-based spatial multiplexing, and whether the information is power control DCI.

Recently, a great deal of research is being conducted to improve usage efficiency of limited radio resources, which is current being considered as a possible approach for reducing DCI overhead.

SUMMARY OF THE INVENTION

Accordingly, an aspect of the present invention is to provide a method and apparatus that reduce Downlink Control Information (DCI) overhead with new DCI formats defined for supporting Multiuser-Multiple Input Multiple Output (MU-MIMO) using a DeModulation Reference Signal (DMRS) having a minimum payload size.

Another aspect of the present invention is to provide a method and apparatus that support both Single User MIMO (SU-MIMO) and MU-MIMO with DMRS by introducing a DMRS port indication field.

Another aspect of the present invention is to provide a method and apparatus that are capable of switching between SU-MIMO and MU-MIMO transmission modes.

Another aspect of the present invention is to provide a method and apparatus that reduce DCI overhead by restricting resource allocation to the use of localized RBs.

Another aspect of the present invention is to provide a method and apparatus that reduce DCI overhead by restricting resource allocation to the use of localized/distributed RB groups.

Another aspect of present invention is to provide a method and apparatus that reduce DCI overhead by restricting resource allocation to rank-1 transmission per user for SU-MIMO and MU-MIMO.

Another aspect of the present invention is to provide a method and apparatus that reduce DCI overhead by introducing a high speed downlink grant flag under an assumption that the same information is transmitted, by using a flag in last DCI formation.

Another aspect of the present invention is to provide a method and apparatus that reduces DCI overhead by introducing a compressed DMRS port indicator.

Another aspect of the present invention is to provide a method and apparatus that reduce DCI overhead by reducing a number of times DCI is transmitted.

Another aspect of the present invention is to provide a method and that reduce DCI overhead while supporting symmetric and asymmetric Hybrid Automatic Repeat Request (HARQ), with a 1 bit flag discriminating between symmetric and asymmetric HARQs.

In accordance with an aspect of the present invention, a method for transmitting DCI by a base station in a wireless communication system is provided. The method includes generating the DCI including at least one of a data format indicator for at least one TB, and a DMRS resource allocation indicator corresponding to the at least one TB; and sending the DCI to a terminal. The DMRS resource allocation indicator includes a rank pattern for the at least one TB, an allocated scrambling code type, and DMRS port information.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF EMBODIMENTS OF THE INVENTION

Various embodiments of the present invention are described in detail below with reference to the accompanying drawings. In the drawings, the same reference numbers are used throughout to refer to the same or like parts. Additionally, detailed descriptions of well-known functions and structures incorporated herein may be omitted to avoid obscuring the subject matter of the present invention.

Generally, an RB includes a plurality of subcarriers/Resource Elements (REs) across a plurality of OFDM symbols that may be continuous or non-continuous in a time domain.

Further, while it is assumed in the following description that an RB includes a plurality of continuous subcarriers across a plurality of continuous OFDM symbols, for ease of description, the embodiments of the present invention can also be applied to non-continuous OFDM symbols.

A control channel is designed to carry the control signaling including DCI for allocating downlink resources. The control channel can be designed differently depending on the system. For example, in the $3^{rd}$ Generation Partnership Project Long Term Evolution (3GPP LTE) release 8, a Physical Downlink Control Channel (PDCCH) is transmitted in a few OFDM symbols starting at the beginning of each subframe.

In the following description, the 3GPP LTE release 8 may be referred to as a conventional system, and 3GPP LTE release 10 may be referred to as a system/method according to an embodiment of the present invention. However, the embodiments of the present invention can also be applied to IEEE 802.16 (WiMAX) and other cellular communication systems.

PDCCH Structure for LTE Release 8

As indicated above, in the 3GPP LTE release 8, PDCCHs are transmitted in a few OFDM symbols at the beginning of each subframe. The number of OFDM symbols used for PDCCH is indicated by a Physical Control Format Indicator Channel (PCFICH). A PDCCH includes L Control Channel Elements (CCEs), where L indicates the aggregation level of 1, 2, 4, or 8 CCEs, and each CCE includes 36 subcarriers that are distributed across an entire bandwidth.

DCI Format Design

In LTE, DCI formats are designed to efficiently send users control information while minimizing payload size and complexity in blind hypotheses testing. Typically, the number of bits for resource allocation is different for the system bandwidth.

Table 1 lists the DCI formats supported in LTE release 8 and the number of bits in a PDCCH for uplink and downlink bandwidth of 50 RBs, corresponding to an approximate 10 MHz spectrum.

TABLE 1

| DCI Format | Purpose | Number of bits including CRC (for system bandwidth of 50 RB and four antennas at eNB) |
|---|---|---|
| 0 | PUSCH grants | 42 |
| 1 | PDSCH assignments with a single codeword | 47 |
| 1A | PDSCH assignments with compact format | 42 |
| 1B | PDSCH assignments for Rank-1 transmission | 46 |
| 1C | PDSCH assignments using very compact format | 26 |
| 1D | PDSCH assignments for MU-MIMO | 46 |
| 2 | PDSCH assignments for closed loop MIMO operation | 62 |
| 2A | PDSCH assignments for open loop MIMO operation | 58 |
| 3 | Transmit Power Control (TPC) commands for multiple users for PUCCH and PUSCH with 2-bit power adjustments | 42 |
| 3A | Transmit Power Control (TPC) commands for multiple users for PUCCH and PUSCH with 1-bit power adjustments | 42 |

DeModulation Reference Signal (DMRS)

A DMRS is introduced to simplify both SU-MIMO and MU-MIMO transmissions. The DMRS allows a transmitter to perform precoding in a same manner as precoding a data symbol. Therefore, a receiver can decode received data symbols without any knowledge on which precoding weight was used.

In order to support multi-layer/multiuser transmissions, the DMRS for the other layer/user is allocated an orthogonal/pseudo-orthogonal resource, which is referred to as a transmission port. In MU-MIMO transmission, multiple users share the same resources for data transmission and their DMRS ports are discriminated for channel estimation. Accordingly, by indicating the DMRS ports, users can efficiently decode a DMRS in an MU-MIMO environment.

PDCCH Transmission and Blind Decoding

After user-specific Cyclic Redundancy Checks (CRCs) are attached, the multiple PDCCHs are coded, rate-matched according to the CCE aggregation level of 1, 2, 3, 4, or 8, multiplexed, and then mapped to the PDCCH resources. The UE searches a predetermined search space using the user-specific CRC under an assumption of a CCE aggregation level. This process can be repeated several times for locating the position of the user-specific PDCCH and thus is commonly referred to as "blind decoding".

HARQ

The HARQ technique is adopted in various communication standards including 3GPP standards. HARQ schemes can be classified as follows:

Synchronous vs Asynchronous

In synchronous HARQ, retransmission happens at fixed time intervals relative to an initial transmission. For example, when the initial transmission occurs in the $n^{th}$ subframe, the retransmission can happen in $(n+4)^{th}$ subframe.

In asynchronous HARQ, retransmission is not required to happen at a fixed time interval relative to the initial transmission.

Adaptive vs non-adaptive

In adaptive HARQ, different resource and Modulation Coding Scheme (MCS) levels are used. Therefore, the resource and the transmission formation of a retransmission are indicated.

In non-adaptive HARQ, the resource and transmission format are the same as an initial transmission. Accordingly, additional transmission resource and format for retransmission is not necessary.

In 3GPP release 8, the synchronous non-adaptive HARQ is used in the uplink and the asynchronous adaptive HARQ in the downlink.

Semi-Persistent Scheduling (SPS)

In the 3GPP release 8, an SPS mechanism is introduced to periodically allocate the same resource for the transmission to/from a specific UE. The resource allocation and periodicity are configured by upper layer signaling. The SPS is activated by transmitting the PDCCH scrambled with an SPS Cellular Radio Network Temporary Identifier (SPS-C-RNTI). The PDCCH activation uses other parameters such as MCS, a HARQ parameter, and virtual CRC for reinforced security, because the parameters are preconfigured according to the upper layer signaling. In order to release the SPS resource, an eNB transmits the PDCCH scrambled with another SPS-C-RNTI.

The following description of certain embodiments of the present invention is directed to an OFDMA communication system in which the same RBs are allocated to one or more users.

More specifically, for simplicity, the description is directed to a system operating with eight transmit antennas, without having to set forth a specific number of receive antennas. It is assumed that the transmitter can support eight layers with the eight transmit antennas. Additionally, it is assumed that the transmitter can support four users for multiuser multiplexing and two layers transmissions for each user and total composite rank of 4.

It is noted that the above-described assumptions are given to simplify the explanation and coincide with the 3GPP release 10 specifications. Nevertheless, the proposed DCI formats can be applied to other systems through a generation process with other assumptions on the parameters.

A description of a DCI format Ax will be provided below under an assumption that there is a maximum of two TBs.

MU-MIMO DCI Format A0

The proposed DCI format A0 allows a full set operation mode to support dynamic SU-MIMO and MU-MIMO switching.

In accordance with an embodiment of the present invention, the DCI format A0 is illustrated in table 2, where the DCI format A includes a data resource allocation indicator, a data format indicator, and a demodulation reference signal resource allocation indicator. Here, the data format indicator can include fields for indicating a type of resource allocation and a user-specific resource allocation. The data format indicator also can include an MCS, a Redundancy Version (RV), and a New Data Indication (NDI) for each of two TBs. The demodulation reference signal resource allocation indicator can include a rank pattern assigned for each TB, scrambling code, and DMRS port information.

The DCI format A0 for the MU-MIMO can include the following information:

1. Resource Allocation Type: For example, a one-bit flag to differentiate between localized RB allocation and distributed RB allocation. The localized RB allocation indicates an allocation of contiguous RBs and the distributed RB allocation indicates an allocation of non-contiguous RBs.

2. A multi-bit field to indicate the resource allocation to the user. The number of bits for this field may depend on both the system bandwidth and the type of resource allocation.

3. Indication for a DMRS port number.

4. MCS, RV, and NDI.

TABLE 2

| Field | Number of Bits |
|---|---|
| Resource Allocation Type | 1 |
| Resource Assignment | Localized: $\lceil \log_2 (N_{RB}^{DL} (N_{RB}^{DL} + 1)/2) \rceil$ <br> Distributed: $\lceil \log_2 (N_{RB}^{DL} (N_{RB}^{DL} + 1)/2) \rceil$ <br> or $\lceil \log_2 (N_{RB}^{DL} (N_{RB}^{DL} + 1)/2) - 1 \rceil$ |
| HARQ Process Index | 3 |
| TPC for PUCCH | 2 |
| MCS, TB1 | 5 |
| NDI, TB1 | 1 |
| RV, TB1 | 2 |
| MCS, TB2 | 5 |
| NDI, TB2 | 1 |
| RV, TB2 | 2 |
| DMRS Port Indication | 3 |

In Table 2, $N_{RB}^{DL}$ indicates a total number of RBs available and is predetermined by system bandwidth.

For a 50 RB system, the number of consumed information bits of DCI format A0 in table 2 is 36.

Note the size of DMRS port indication field may depend on the detailed design of DMRS port in the system.

A 3-bit DMRS port indication for a design using 2 orthogonal spreading sequences and 2 scrambling sequences is shown below in table 3. Specifically, Table 3 shows the DMRS port indication for 2 TBs (2 original DMRS ports using spreading factor 2 and 2 scrambling sequences when MU-MIMO is used).

TABLE 3

| One TB Enabled | | Both TB Enabled | |
|---|---|---|---|
| Index | Message | Index | Message |
| 0 | Rank 2 pattern, DMRS port 0 with SC0 allocated | 0 | Rank 2 pattern, DMRS port 0, 1 with SC0 allocated |
| 1 | Rank 2 pattern, DMRS port 1 with SC0 allocated | 1 | Rank 4 pattern, DMRS port 0, 1, 2 with SC0 allocated |
| 2 | Rank 2 pattern, DMRS port 0 with SC1 allocated | 2 | Rank 2 pattern, DMRS port 0, 1 with SC1 allocated |
| 3 | Rank 2 pattern, DMRS port 1 with SC1 allocated | 3 | Rank 4 pattern, DMRS port 0, 1, 2, 3 with SC0 allocated |
| 4 | Rank 2 pattern, DMRS port 0, 1 with SC0 allocated | 4 | Rank 8 pattern, DMRS port 0, 1, 2, 3, 4 with SC0 allocated |
| 5 | Rank 2 pattern, DMRS port 0, 1 with SC1 allocated | 5 | Rank 8 pattern, DMRS port 0, 1, 2, 3, 4, 5 with SC0 allocated |
| 6 | Rank 4 pattern, DMRS port 0, 1, 2 with SC0 allocated | 6 | Rank 8 pattern, DMRS port 0, 1, 2, 3, 4, 5, 6 with SC0 allocated |
| 7 | Rank 4 pattern, DMRS port 0, 1, 2, 3 with SC0 allocated | 7 | Rank 8 pattern, DMRS port 0, 1, 2, 3, 4, 5, 6, 7 with SC0 allocated |

MU-MIMO DCI Format A1

A proposed DCI format A1 limits a smallest resource assignment in a RB Group (RBG). An RBG includes a plurality of RBs, and the number of RBs in an RBG is predefined and system bandwidth dependent.

In accordance with an embodiment of the present invention, the DCI format A1 is illustrated in Table 4, where the DCI format A1 includes the following:

1. A one-bit flag to differentiate the type of resource allocation, e.g., localized RBG allocation or distributed RBG allocation.

2. A multi-bit field to indicate the resource allocation to the user. The number of bits for this field may depend on both system bandwidth as well as the type of resource allocation.

3. Indication for a DMRS port number.

4. Indication of a HARQ process index, TPC for PUCCH.

5. MCS, RV, and NDI for each of the two TBs.

Table 4 shows the DCI format A1 according to an embodiment of the present invention.

TABLE 4

| Field | Number of Bits |
|---|---|
| Resource Allocation Type | 1 |
| Resource Assignment | Localized: $\lceil \log_2 (N_{RBG}^{DL} (N_{RBG}^{DL} + 1)/2) \rceil$ <br> Distributed: $\lceil \log_2 (N_{RBG}^{DL} (N_{RBG}^{DL} + 1)/2) \rceil$ <br> or $\lceil \log_2 (N_{RBG}^{DL} (N_{RBG}^{DL} + 1)/2) - 1 \rceil$ |
| HARQ Process Index | 3 |
| TPC for PUCCH | 2 |
| MCS, TB1 | 5 |

TABLE 4-continued

| Field | Number of Bits |
| --- | --- |
| NDI, TB1 | 1 |
| RV, TB1 | 2 |
| MCS, TB2 | 5 |
| NDI, TB2 | 1 |
| RV, TB2 | 2 |
| DMRS Port Indication | 3 |

In Table 4, $$N_{RBG}^{DL} = \left\lceil \frac{N_{RB}^{DL}}{P} \right\rceil$$

indicates a total number of RBGs available, and P is dependent on system bandwidth and is predefined.

For a 50 RB system, the number of consumed information bits of DCI format A1 in the above Table 4 is 33.

MU-MIMO DCI Format A2

A proposed DCI format A2 limits a resource assignment only with contiguous RBs.

In accordance with an embodiment of the present invention, the DCI format A2 includes a resource allocation type field for indicating whether the resource allocation is the localized RB allocation or the distributed RB allocation.

The DCI format A2 is illustrated in Table 5, where the DCI format A2 includes the following:

1. A multi-bit field to indicate the resource allocation to the user. The number of bits for this field may depend on system bandwidth;
2. Indication for a DMRS port number;
3. Indication of a HARQ process index, TPC for PUCCH;
4. MCS, RV, and NDI for each of the two TBs.

Table 5 shows the DCI format A2 according to an embodiment of the present invention.

TABLE 5

| Field | Number of Bits |
| --- | --- |
| Resource Assignment | $\lceil \log_2 (N_{RB}^{DL} (N_{RB}^{DL} + 1)/2) \rceil$ |
| HARQ Process Index | 3 |
| TPC for PUCCH | 2 |
| MCS, TB1 | 5 |
| NDI, TB1 | 1 |
| RV, TB1 | 2 |
| MCS, TB2 | 5 |
| NDI, TB2 | 1 |
| RV, TB2 | 2 |
| DMRS Port Indication | 3 |

For a 50 RB system, the number of consumed information bits of DCI formats A2 embodiment in Table 5 is 35.

MU-MIMO DCI Format A3

A proposed DCI format A3 limits a smallest resource assignment in an RBG and only allows contiguous assignment (i.e., localized RGB allocation). Because only contiguous assignment is allowed, the resource allocation type field for indicating whether the resource allocation is the localized RB allocation or the distributed RB allocation is not used, as in the MU-MIMO DCI format A2.

The DCI format A3 according to an embodiment of the present invention is illustrated in Table 6, where the DCI format A3 includes the following:

1. A one-bit flag to differentiate the type of resource allocation, e.g., localized RBG allocation or distributed RBG allocation.
2. A multi-bit field to indicate the resource allocation to the user. The number of bits for this field may depend on both system bandwidth as well as the type of resource allocation.
3. Indication for a DMRS port number.
4. Indication of a HARQ process index; TPC for PUCCH.
5. MCS, RV, and NDI for each of the two TBs.

TABLE 6

| Field | Number of Bits |
| --- | --- |
| Resource Assignment | Localized: $\lceil \log_2 (N_{RBG}^{DL} (N_{RBG}^{DL} + 1)/2) \rceil$ |
| HARQ Process Index | 3 |
| TPC for PUCCH | 2 |
| MCS, TB1 | 5 |
| NDI, TB1 | 1 |
| RV, TB1 | 2 |
| MCS, TB2 | 5 |
| NDI, TB2 | 1 |
| RV, TB2 | 2 |
| DMRS Port Indication | 3 |

For a 50 RB system, the number of consumed information bits of DCI format A3 in Table 6 is 32.

A proposed DCI format Ax, as described above assumes a maximum of two transmission blocks. Accordingly, control signaling for both TBs is presented separately and independently. In a DCI format Bx family, as will be described below, the number of TBs is limited to only one. Accordingly, the number of layers supported per UE is also limited to one only.

MU-MIMO DCI Format B0

A DCI format B1 according to an embodiment of the present invention is illustrated in Table 7, where the DCI format B1 includes the following:

1. A one-bit flag to differentiate the type of resource allocation, e.g., localized RB allocation or distributed RB allocation.
2. A multi-bit field to indicate the resource allocation to the user. The number of bits for this field may depend on system bandwidth.
3. Indication for a DMRS port number.
4. Indication of a HARQ process index; TPC for PUCCH.
5. MCS, RV, and NDI for the transmitted TB.

TABLE 7

| Field | Number of Bits |
| --- | --- |
| Resource Allocation Type | 1 |
| Resource Assignment | Localized: $\lceil \log_2 (N_{RB}^{DL} (N_{RB}^{DL} + 1)/2) \rceil$ <br> Distributed: $\lceil \log_2 (N_{RB}^{DL} (N_{RB}^{DL} + 1)/2) \rceil$ <br> or $\lceil \log_2 (N_{RB}^{DL} (N_{RB}^{DL} + 1)/2) - 1 \rceil$ |
| HARQ Process Index | 3 |
| TPC for PUCCH | 2 |
| MCS, TB2 | 5 |
| NDI, TB2 | 1 |
| RV, TB2 | 2 |
| DMRS Port Indication | 2 |

For a 50 RB system, the number of consumed information bits of DCI format B0 in Table 7 is 28.

By limiting the maximum number of TBs and rank per UE to one, the DMRS port indication field can be further reduced with 1 bit.

A DMRS port indication format is illustrated below in Table 8. Specifically, Table 8 shows a DMRS port indication for 1 TB (2 orthogonal DMRS ports using spreading factor 2 and 2 scrambling sequences when MU-MIMO is used).

TABLE 8

One TB Enabled

| Index | Message |
|---|---|
| 0 | Rank 2 pattern, DMRS port 0 with SC0 allocated |
| 1 | Rank 2 pattern, DMRS port 1 with SC0 allocated |
| 2 | Rank 2 pattern, DMRS port 0 with SC1 allocated |
| 3 | Rank 2 pattern, DMRS port 1 with SC1 allocated |

MU-MIMO DCI Format B1

Similar to DCI format A1, a proposed DCI format B1 limits a smallest resource assignment in a RBG.

The DCI format B1 according to an embodiment of the present invention is shown in Table 9, where the DCI format B1 includes the following:

1. A one-bit flag to differentiate the type of resource allocation, e.g., localized RBG allocation or distributed RBG allocation.

2. A multi-bit field to indicate the resource allocation to the user. The number of bits for this field may depend on both system bandwidth as well as the type of resource allocation.

3. Indication for a DMRS port number.

4. Indication of a HARQ process index; TPC for PUCCH.

5. MCS, RV, and NDI for the transmitted TB.

TABLE 9

| Field | Number of Bits |
|---|---|
| Resource Allocation Type | 1 |
| Resource Assignment | Localized: $\lceil \log_2 (N_{RBG}^{DL} (N_{RBG}^{DL} + 1)/2) \rceil$<br>Distributed: $\lceil \log_2 (N_{RBG}^{DL} (N_{RBG}^{DL} + 1)/2) \rceil$<br>or $\lceil \log_2 (N_{RBG}^{DL} (N_{RBG}^{DL} + 1)/2) - 1 \rceil$ |
| HARQ Process Index | 3 |
| TPC for PUCCH | 2 |
| MCS, TB1 | 5 |
| NDI, TB1 | 1 |
| RV, TB1 | 2 |
| DMRS Port Indication | 2 |

For a 50 RB system, the number of consumed information bits of DCI format B1 in Table 9 is 24.

MU-MIMO DCI Format B2

A proposed DCI format B2 limits a resource assignment only with contiguous RBs. The DCI format B2 according to an embodiment of the present invention is shown in Table 10 below, where the DCI format B2 includes the following:

1. A multi-bit field to indicate the resource allocation to the user. The number of bits for this field may depend on system bandwidth.

2. Indication for a DMRS port number.

3. Indication of a HARQ process index, TPC for PUCCH.

4. MCS, RV, and NDI for the TB.

TABLE 10

| Field | Number of Bits |
|---|---|
| Resource Assignment | $\lceil \log_2 (N_{RB}^{DL} (N_{RB}^{DL} + 1)/2) \rceil$ |
| HARQ Process Index | 3 |
| TPC for PUCCH | 2 |
| MCS, TB1 | 5 |
| NDI, TB1 | 1 |
| RV, TB1 | 2 |
| DMRS Port Indication | 2 |

For a 50 RB system, the number of consumed information bits of DCI formats B2 in Table 10 is 26.

MU-MIMO DCI Format B3

A proposed DCI format B3 limits a smallest resource assignment to an RBG and only allows contiguous assignment. Accordingly, according to an embodiment of the present invention, with the DCI format B3, the resource allocation type field for indicating whether the resource allocation is the localized RB allocation or the distributed RB allocation is not used.

The DCI format B3 according to an embodiment of the present invention is shown in Table 11, where the DCI format B3 includes the following:

1. A multi-bit field to indicate the resource allocation to the user. The number of bits for this field may depend on both system bandwidth as well as the type of resource allocation.

2. Indication for DMRS port number.

3. Indication of HARQ process index, TPC for PUCCH.

4. MCS, RV, and NDI for the TB.

TABLE 11

| Field | Number of Bits |
|---|---|
| Resource Assignment | Localized: $\lceil \log_2 (N_{RBG}^{DL} (N_{RBG}^{DL} + 1)/2) \rceil$ |
| HARQ Process Index | 3 |
| TPC for PUCCH | 2 |
| MCS, TB1 | 5 |
| NDI, TB1 | 1 |
| RV, TB1 | 2 |
| DMRS Port Indication | 2 |

For a 50 RB system, the number of consumed information bits of DCI format A3 in Table 11 is 23.

MU-MIMO DCI Format C-A

A proposed DCI format C-A is a compact indication that DCI control information regarding a resource allocation included in a last transmission is still valid. When DCI format C-A is received, the user assumes the assigned RBs information received in last DCI format A is still valid for the present sub-frame.

The DCI format C-A according to an embodiment of the present invention is shown in Table 12, where the DCI format C includes the following:

1. Indication of HARQ process index, TPC for PUCCH.

2. MCS, RV, and NDI for each of the two TBs.

Additionally, the DCI format C does not include an indication of the resource allocation to the user.

TABLE 12

| Field | Number of Bits |
|---|---|
| HARQ Process Index | 3 |
| TPC for PUCCH | 2 |
| MCS, TB1 | 5 |
| NDI, TB1 | 1 |
| RV, TB1 | 2 |

TABLE 12-continued

| Field | Number of Bits |
|---|---|
| MCS, TB2 | 5 |
| NDI, TB2 | 1 |
| RV, TB2 | 2 |
| DMRS Port Indication | 3 |

The number of consumed information bits of DCI format C-A in Table 12 is 23 (20 if DMRS indication is not included), regardless of system bandwidth.

MU-MIMO DCI Format C-B

A proposed DCI format C-B is a compact indication that DCI control information regarding a resource allocation included in a last transmission is still valid. When DCI format C-B is received, the user assumes the assigned RBs information received in the last DCI format B is still valid for the present sub-frame.

The DCI format C-B according to an embodiment of the present invention is shown in Table 13, where the DCI format C-B includes the following:
1. Indication of HARQ process index, TPC for PUCCH.
2. MCS, RV, and NDI for the TB.

Additionally the DCI format C-B does not include an indication of the resource allocation to the user.

Alternatively, in a DCI format C-B according to another embodiment of the present invention, the "DMRS Port Indication" field can also be excluded, and the same DMRS port indication as in last transmitted DCI format B will be assumed.

TABLE 13

| Field | Number of Bits |
|---|---|
| HARQ Process Index | 3 |
| TPC for PUCCH | 2 |
| MCS, TB1 | 5 |
| NDI, TB1 | 1 |
| RV, TB1 | 2 |
| DMRS Port Indication | 2 |

The number of consumed information bits of DCI format C-B in Table 13 is 15 (13 if DMRS indication is not included), regardless of system bandwidth.

MU-MIMO DCI Format C0

A proposed DCI format C0 is a compact indication that DCI control information regarding transmission formats included in a last transmission is still valid. When DCI format C0 is received, the user assumes the assigned transmission formats information received in the last DCI format A/B is still valid for the present sub-frame. In accordance with another embodiment of the present invention, the user assumes the assigned transmission format has been changed according to a predefined hopping pattern.

The DCI format C0 according to an embodiment of the present invention is shown in Table 14, where the DCI format C0 includes a resource allocation for the one or two TBs.

Additionally, the DCI format C0 does not include MCS, RV, and NDI for the one or two TBs.

In a DCI format C0 according to another embodiment of the present invention, the "Resource Allocation Type Port Indication" field can also be excluded and the same localized resource assignment will be assumed as in DCI format A2/A3/B2/B3.

In a DCI format C0 according to yet another embodiment of the present invention, the "Resource Assignment" can be RBG based, as in DCI format A2/A4/B2/B4.

Table 14 shows the DCI format C0 according to an embodiment of the present invention.

TABLE 14

| Field | Number of Bits |
|---|---|
| Resource Allocation Type | 1 |
| Resource Assignment | Localized: $\lceil \log_2 (N_{RB}^{DL} (N_{RB}^{DL} + 1)/2) \rceil$ <br> Distributed: $\lceil \log_2 (N_{RB}^{DL} (N_{RB}^{DL} + 1)/2) \rceil$ <br> or $\lceil \log_2 (N_{RB}^{DL} (N_{RB}^{DL} + 1)/2) - 1 \rceil$ |

For a 50 RB system, the number of consumed information bits of DCI format C0 in Table 14 is 12.

MU-MIMO DCI Format C1

A proposed DCI format C1 is a very compact indication of whether DCI control information included in a last transmission is still valid or not. When DCI format C1 is received, the user shall assume all the information received in last DCI format A or B is still valid for the present sub-frame.

The DCI format C1 according to an embodiment of the present invention is shown in Table 15, where the DCI format C1 includes a one-bit flag to indicate the sync-indication. The user will continue to use the downlink control information included in the last transmitted DCI format A or B if DCI format C1 is received.

TABLE 15

| Field | Number of Bits |
|---|---|
| Sync-Indication | 1 |

The number of consumed information bits of DCI format C1 in Table 15 is one, regardless of system bandwidth.

The number of DCI information bits can be summarized as shown in Table 16 for a 50 RB system.

Table 16 shows the DCI Size in bits for the above-described DCI formats for a 50-RB system.

TABLE 16

| DCI Format | |
|---|---|
| A0 | 36 |
| A1 | 33 |
| A2 | 35 |
| A3 | 32 |
| B0 | 28 |
| B1 | 25 |
| B2 | 27 |
| B3 | 24 |
| C-A | 23 |
| C-B | 15 |
| C0 | 12 |
| C1 | 1 |

The DCI formats A0/A1/A2/A3 support 2 TBs and MU-MIMO with up to composite rank 4 with up to 2 layers per user, and SU-MIMO with up to rank 8.

The DCI formats B0/B1/B2/B3 support 1 TB and MU-MIMO with up to composite rank 4 with 1 layer per user, and SU-MIMO with rank 1.

The DCI formats C-A/C-B/C0/C1 are complementary DCI formats of DCI formats A/B and cannot be transmitted independently, i.e., they are transmitted after a transmission of DCI format A0/A1/A2/A3/B0/B1/B2/B3, where DCI format C-A can be transmitted after a transmission of DCI format A0/A1/A2/A3, DCI format C-B can be transmitted after a transmission of DCI format B0/B1/B2/B3, and DCI format C0/C1 can be transmitted after any DCI format A and B family.

In implementation of the proposed various types of DCI formats, a subset of a combination may be utilized; for example, one from DCI format family A to support full-scale of MIMO transmission, one from DCI family B to support rank 1 MIMO transmission, and one from DCI family C to support quick grant of DL resources, or any combination of the three DCI formats.

Figure 1:
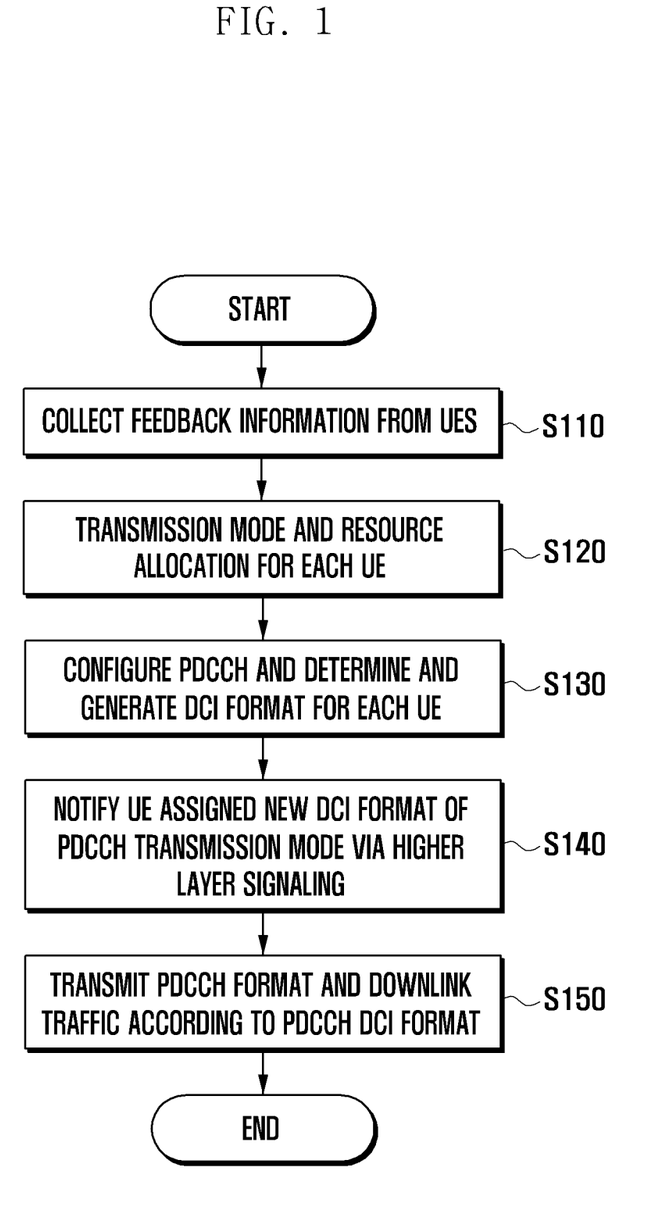
FIG. 1 is a flowchart a downlink transmission method of an extended Node B (eNB) in a wireless communication system according to an embodiment of the present invention.

FIG. 1 is a flowchart illustrating a downlink transmission method of an eNB in a wireless communication system according to an embodiment of the present invention.

Referring to FIG. 1, the eNB receives feedback information from UEs in step S110. The feedback information can include at least one of a Channel Quality Indicator (CQI) and a Precoding Matrix Indicator (PMI). In step S120, the eNB determines the transmission mode and resource for each UE. Here, the transmission mode can include the information on whether the transmission diversity is applied or not, whether the SU-MIMO or MU-MIMO is applied, and whether the open-loop MIMO or closed-loop MIMO is applied.

In step S130, the eNB generates the PDCCH configuration and DCI format for each UE. When generating the DCI format, the eNB selects an optimal DCI formation for each UE among the DCI formats A and B according to the UE-specific feedback information and transmission mode and resource allocation type for each UE.

The eNB will then notify each UE of whether to transmit the control information in the convention DCI format or the new DCI format proposed in the above-described embodiments of the present invention. For this purpose, the eNB notifies the UE to which the newly proposed DCI format is assigned of the PDCCH transmission mode via higher layer signaling in step S140.

In step S150, the eNB transmits the PDCCH DCI format and the downlink traffic in accordance with the PDCCH DCI format to each UE.

Figure 2:
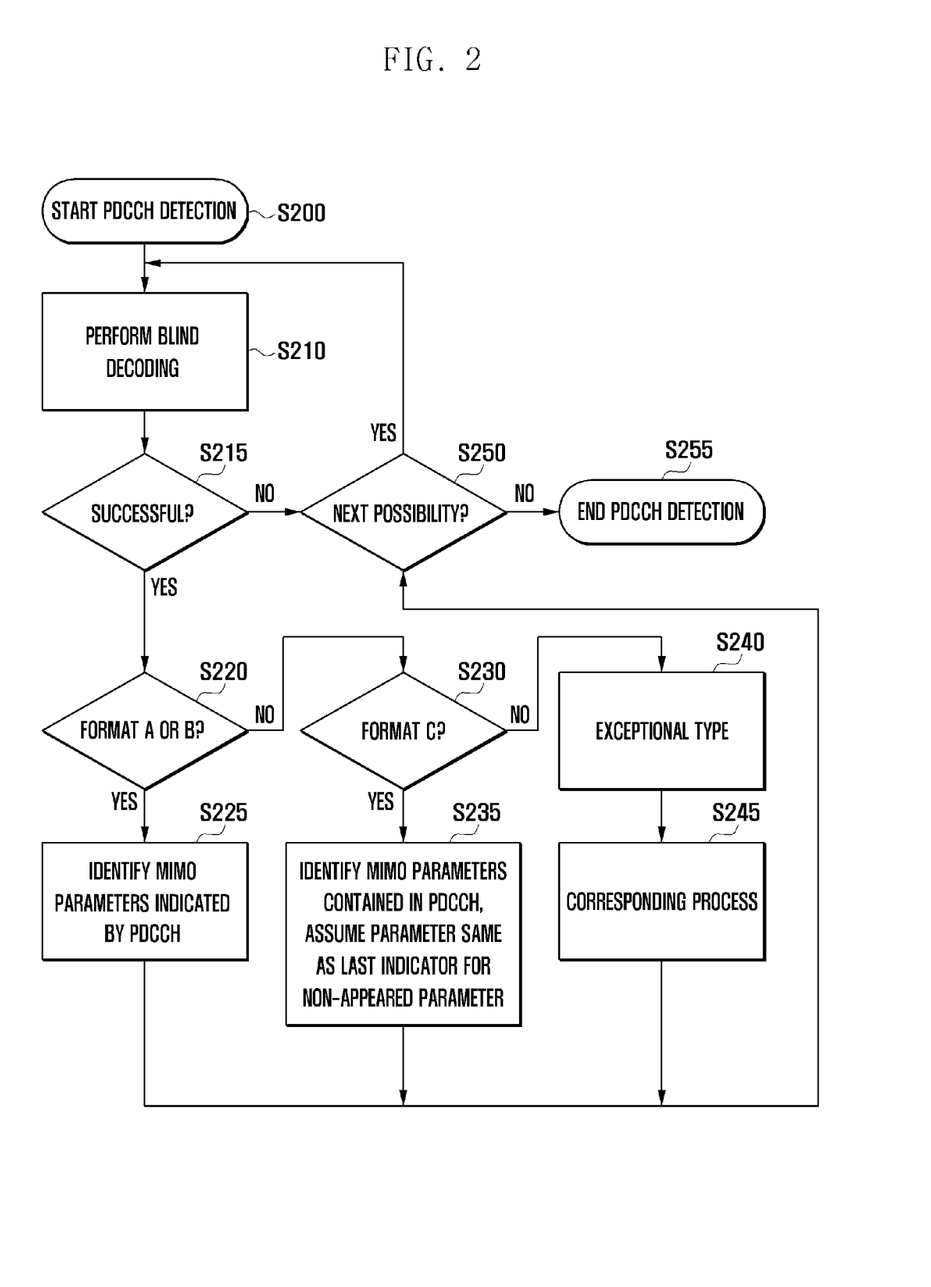
FIG. 2 is a flowchart illustrating a downlink transmission method of a UE in a wireless communication system according to an embodiment of the present invention.

FIG. 2 is a flowchart illustrating a downlink transmission method of UE in a wireless communication system according to an embodiment of the present invention.

Referring to FIG. 2, the UE starts monitoring to extract its own PDCCH in step S200. In step S210, the UE performs blind PDCCH decoding. At this time, the UE has to blindly attempt to decode the control information under the assumption of an arbitrary CCE aggregation level and arbitrary DCI format type that is discriminated by length. The UE determines whether the decoding attempt is successful in step S215.

If the decoding attempt is successful at step 215, the UE determines whether the decoded DCI format is type A/B in step S220. If it is determined that the DCI format is type A or B at step S220, the UE identifies the MIMO parameters included in the PDCCH, e.g., data resource allocation indicator, data format indicator, and demodulation reference signal resource, in step S225. Here, the data format indicator can include the fields for the resource allocation type and user-specific resource allocation indication. The data format indicator also can include MCS, RV, and NDI for each of one or two TBs. The demodulation reference signal resource allocation indicator can include rank pattern assigned to each TB, scrambling code, and DMRS port information.

If it is determined that the DCI format is not type A or B at step S220, the UE determines whether the DCI format is type C in step S230. As described above, the DCI format C can be received after the DCI format A or B has been received.

If it is determined that the DCI format is type C in step S230, the UE identifies the MIMO parameter contained in the PDCCH in step S235. Specifically, the UE compares the currently received DCI formation with the previously received DCI format. The UE assumes the parameter that has been in the previous DCI format, but not in the current DCI format, as the same parameter of the parameter included in the previous DCI formation.

More specifically, if it is determined that the DCI format received from the eNB is identified as the DCI format C-A/C-B/C0, the UE updates the MIMO resource or parameters indicated by the DCI. Simultaneously, the UE uses the same information indicated by the last DCI for the parameters that are not included in the current DCI. If the DCI format type is identified as the proposed DCI format C1, the UE reuses the same MIMO resource and parameters as those in the last subframe.

If it is determined that the DCI format is not type C in step S230, the UE determines that the DCI format is an exceptional type in step S240 and executes a corresponding process in step S245.

If the decoding attempt is unsuccessful at step 215, the UE determines whether it is possible to detect a PDCCH in next subframe at step 250. If it is not possible to detect a PDCCH in next subframe, the UE ends PDCCH detection In order to use the limited radio resource, it is possible to reduce the number of control signaling times in addition to the reducing the control signal overhead. In accordance with an embodiment of the present invention, three approaches for reducing the number of control signaling times, i.e., synchronous and non-adaptive HARQ indication in the MU-MIMO DCI format, synchronous and non-adaptive HARQ configuration via higher layer signaling, and synchronous and non-adaptive HARQ configuration semi-persistent scheduling, are provided.

Synchronous and Non-Adaptive HARQ Indication in MU-MIMO DCI Formats

In the 3GPP release 8, the downlink, by default, adopts asynchronous and non-adaptive HARQ. Accordingly, whenever a retransmission is performed, an accompanying DCI format should be transmitted to indicate the transmit resources and format of the retransmission.

In accordance with an embodiment of the present invention, a 1-bit field is presented in a DCI format for downlink resource allocation, e.g., in addition to the A/B/C DCI formats described above. This 1-bit field is set to indicate if the retransmission is Asynchronous and Adaptive (A&A) or Synchronous and Non-adaptive (S&N).

Table 17 shows the DCI format including the HARQ type configuration according to an embodiment of the present invention.

TABLE 17

| Field | Number of Bits |
|---|---|
| ... | ... |
| HARQ Type | 1 |
| ... | ... |

Figure 3:
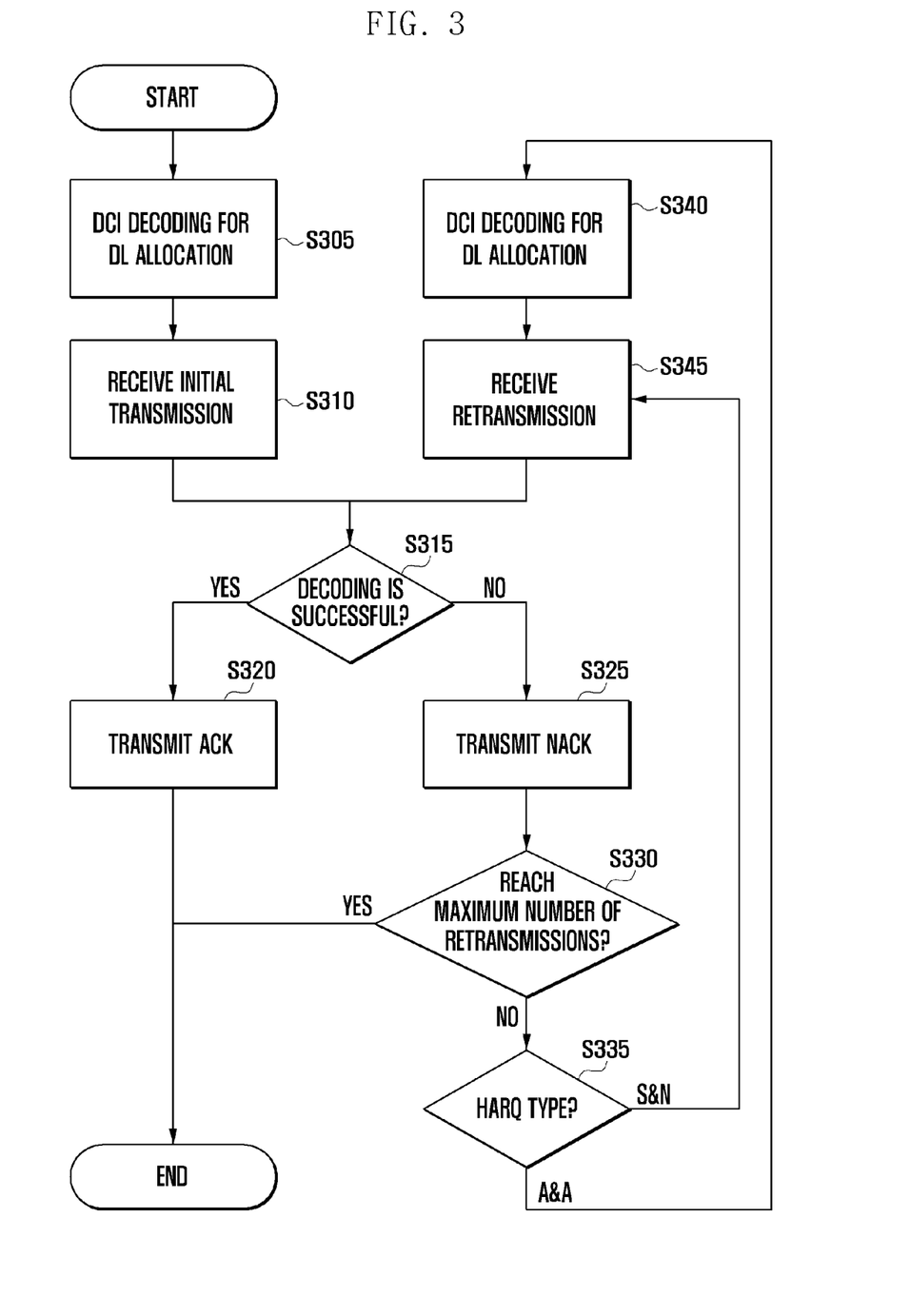
FIG. 3 is a flowchart illustrating HARQ operations of a UE in the communication system according to an embodiment of the present invention.

FIG. 3 is a flowchart illustrating HARQ operations of a UE in a communication system with HARQ type configuration capability according to an embodiment of the present invention.

Referring to FIG. 3, when a transmission is scheduled, the UE receives the DCI formation for downlink scheduling, which includes the HARQ type indication. The UE attempts decoding DCI format for the downlink resource allocation in step S305 and, if the decoding attempt is successful, the UE attempts decoding the initial transmission in step S310.

In step S315, the UE determines whether the decoding attempt for the initial transmission is successful. If the decoding attempt for the initial transmission is successful in step S315, the UE sends an ACK to the serving eNB in step S320 and waits for a next transmission.

However, if the decoding attempt of the initial transmission is unsuccessful in step S315, the UE sends a NACK to the serving eNB in step S325 and waits for a retransmission.

In this case, the UE determines whether the number of retransmission has reached a maximum value in step S330. If the number of retransmissions has reached the maximum value, the UE ends the HARQ process. However, if the number of retransmissions has not reached the maximum value in step S330, the UE determines whether the HARQ type is A&A or S&N in step S335.

If it is determined the HARQ type is A&A in step S335, the UE attempts decoding DCI format for downlink scheduling of the retransmission in step S340.

If the HARQ type is S&N in step S335, the UE attempts receiving a retransmission and decoding the retransmission at a predetermined timing (e.g., at an interval of 4 subframes from the initial/last transmission) based on the transmission resource and format indicated in the last DCI format in step S345, without a DCI format decoding attempt for the retransmission.

Synchronous and Non-Adaptive HARQ Configuration Via a Higher Layer

In accordance with another embodiment of the present invention, a UE can operate in an S&N HARQ mode by Radio Link Control (RLC) message or other higher layer configuration message. This newly designed message includes an indication field to indicate whether the targeted UE is configured to S&N HARQ mode or A&A HARQ mode. When an UE is configured to work in S&N HARQ mode, the UE tries to find control indication for the initial transmission. If a decoding error occurs, the UE sends a NACK to eNB and then tries to locate and decode the retransmission by assuming non-adaptive resource allocation same as the initial transmission. This procedure is similar to what is illustrated in FIG. 2 in that the HARQ type is pre-configured by higher layer rather than from the DCI format.

Synchronous and Non-Adaptive HARQ Configuration Via Semi-Persistent Scheduling

It is also possible to configure S&N HARQ via SPS configurations. The SPS-based S&N HARQ configuration can be implemented as described below in the following examples.

Example 1

Improved SPS Higher Layer Configuration

The SPS parameters, such as resource allocation, repetition periodicity, and SPS-C-RNTI are conventionally configured by higher layer (e.g., RRC) signaling. In an embodiment of the present invention, the S&N HARQ is configured by higher layer signaling as well by adding a new information field to the conventional SPS configuration message to indicate whether the S&N HARQ process is turned on or off.

Example 2

Modified SPS-PDCCH Format

Typically, the parameters such as resource allocation, repetition periodicity, and SPS-C-RNTI are configured by higher layer signaling so that the identical information such as resource allocation, MCS, and HARQ parameters in PDCCH become redundant. Those bits are instead set to fixed values and used by the receiver as virtual CRC to ensure roust SPS activation/deactivation. The virtual CRC configuration for SPS activation in 3GPP Release 8 is shown below in Table 18. Specifically, Table 18 shows fixed bits for Downlink SPS Activation in 3GPP Release 8.

TABLE 18

| | DCI format 1/1A | DCI format 2/2A |
|---|---|---|
| HARQ Process Index | FDD: set to '000' TDD: set to '0000' | FDD: set to '000' TDD: set to '0000' |
| MCS | MSB is set to '0' | For the enabled TB, MSB is set to '0' |
| RV | Set to '00' | For the enabled TB, set to '00' |

In Table 18, one of the virtual CRC bits can be used for S&N HARQ indication. For example, the MSB bit of the MCS field for the enabled TB can be taken to indicate whether the S&N HARQ is turned on or off for the retransmission.

Figure 4:
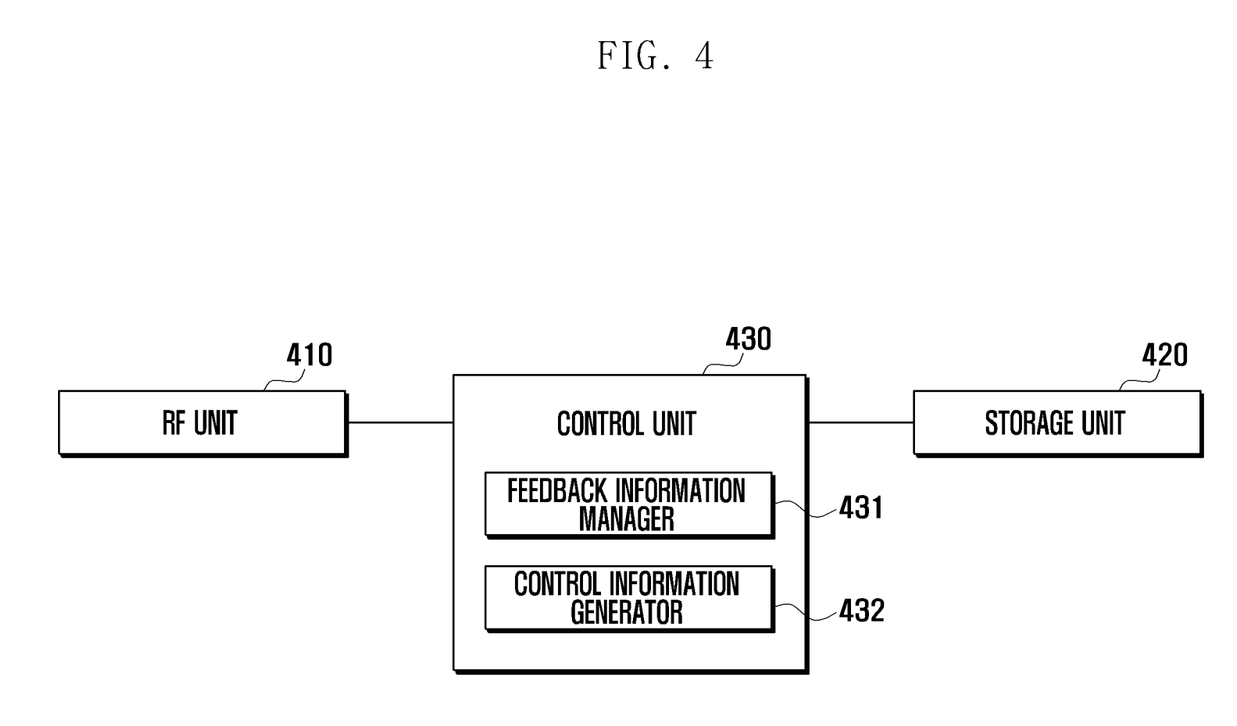
FIG. 4 is a block diagram illustrating an eNB according to an embodiment of the present invention.

FIG. 4 is a block diagram illustrating an eNB according to an embodiment of the present invention.

Referring to FIG. 4, the eNB includes a Radio Frequency (RF) unit 410, a storage unit 420, and a control unit 430.

The RF unit 410 is responsible for transmitting and receiving radio signals carrying communication data. Particularly, in accordance with an embodiment of the present invention, the RF unit 410 transmits the control information generated by the control unit 430 to a UE.

The storage unit 420 stores programs and data for the operation of the eNB. According to an embodiment of the present invention, the storage unit 420 stores the feedback information transmitted by the UE, which is used for generating the control information for the corresponding UE.

The control unit 430 controls the operation of the eNB. Particularly, the control unit 430 includes a feedback information manager 431 and a control information generator 432.

The feedback information manager 431 receives the feedback information transmitted by the UE such as a CQI and a PMI and stores the received feedback information in the storage unit 420. The feedback information can be used for generating the UE-specific control information.

The control information generator 432 determines the transmission mode and resource for each UE. Here, the transmission mode can include the information on whether to apply transmit diversity, whether to apply SU-MIMO or MU-MIMO, and whether to apply open-loop MIMO or closed loop MIMO. The control information generator 432 generates the PDCCH configuration and DCI format for each UE. When configuring the DCI format, the control information generator 432 selects an optimum DCI format from the DCI formats A and B families based on the previously collected feedback information, transmission mode, and resource allocation type of the UE.

The control information includes at least one of a data resource allocation indicator, a data format indicator for at least one TB, and DMRS resource allocation indicator corresponding to the at least one TB. The DMRS resource allocation indicator includes the rank pattern of the TB, allocated scrambling code type, and DMRS port information, and it can further include the index information shown in Table 2 or Table 8.

The resource can be allocated in a unit of a localized or distributed RB group, a localized RB, or a localized RB group.

According to another embodiment of the present invention, the control information can further include the resource allocation information, data format information, and/or indicator for indicating reuse of the control information included in a last control information transmitted to the UE.

According to yet another embodiment of the present invention, the control information generator 432 can control the eNB such that the HARQ type indication information is included in the control information or sent to the UE by higher layer signaling.

Figure 5:
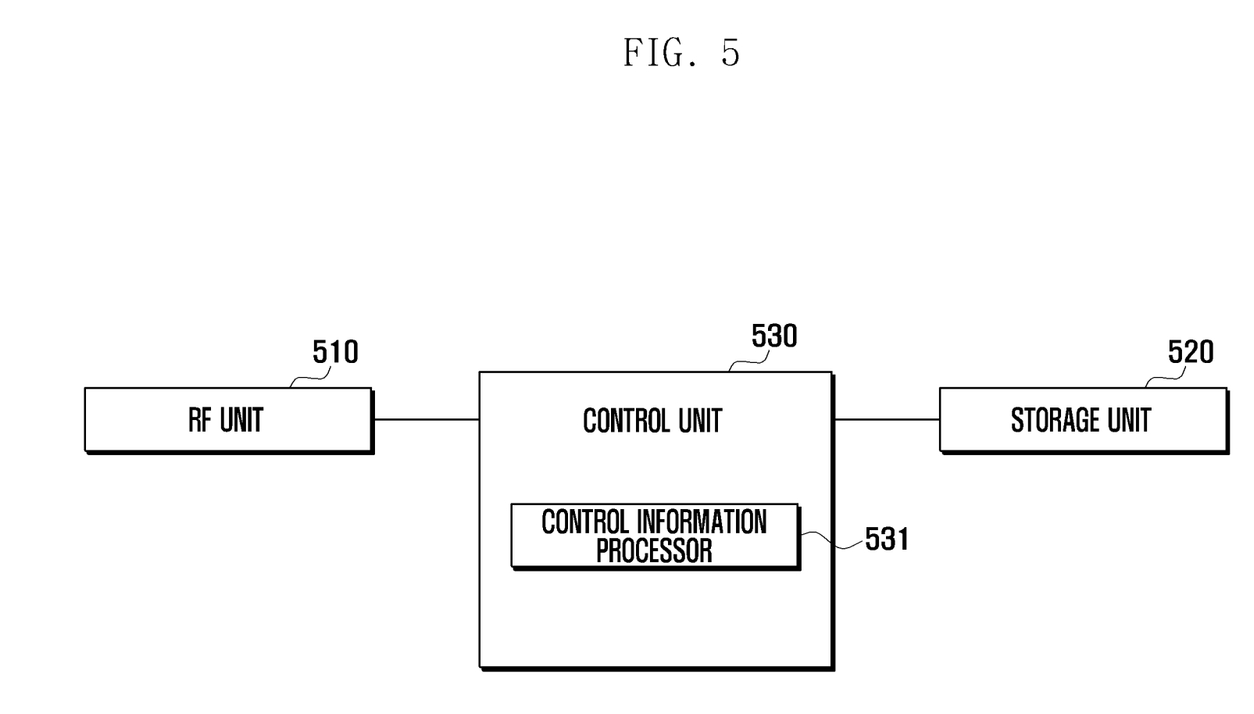
FIG. 5 is a block diagram illustrating a UE according to an embodiment of the present invention.

FIG. 5 is a block diagram illustrating a UE according to an embodiment of the present invention.

Referring to FIG. 5, the UE according includes an RF unit 510, a storage unit 520, and a control unit 530.

The RF unit 510 is responsible for transmitting/receiving radio signals carrying communication data of the UE. Particularly, in accordance with an embodiment of the present invention, the RF unit 510 receives the control signal transmitted by the eNB. The control signal includes at least one of a data resource allocation indicator, a data format indicator for at least one TB, or a DMRS resource allocation indicator corresponding to the at least one TB.

The storage unit 520 stores programs and data for the operation of the UE. According to an embodiment of the present invention, the storage unit 520 can temporarily store the feedback information to be transmitted to the eNB.

The control unit 530 controls the operation of the UE. Particularly, in accordance with an embodiment of the present invention, the control unit 530 can further include a control information processor 531.

The control information processor 531 performs blind decoding on the control information received from the eNB and checks the type of the DCI format included in the control information. The control information processor 531 stores the parameters included in the control information according to the identified DCI format and configures the UE to operate with these parameters.

As described above, a DCI transmission method and apparatus according to the above-described embodiments of the present invention is capable of transmitting the control information to more users and reducing the number of bits for the control information, as compared to the conventional techniques, thereby improving resource usage efficiency.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

What is claimed is:

1. A method for wireless communication, the method comprising:
   generating downlink control information including a demodulation reference signal (DMRS) port indicator associated with at least one transport block; and
   transmitting the downlink control information and data corresponding to the downlink control information to a terminal,
   wherein the DMRS port indicator includes antenna port information, scrambling identity information, and rank information.

2. The method of claim 1, wherein the scrambling identity information indicates one of two scrambling sequences based on the rank information.

3. The method of claim 1, wherein the scrambling identity information indicates a first scrambling sequence, if the rank information indicates a rank being greater than a predetermined value.

4. The method of claim 3, wherein the predetermined value is 2.

5. The method of claim 3, the rank is a number of layers.

6. The method of claim 1, wherein the downlink control information further includes a resource assignment, a hybrid automatic repeat request (HARQ) process index, a transmit power control for a physical uplink control channel, a modulation and coding scheme, a redundancy version, and a new data indicator.

7. A method for wireless communication, the method comprising:
   receiving downlink control information and data corresponding to the downlink control information, wherein the downlink control information includes a demodulation reference signal (DMRS) port indicator associated with at least one transport block; and
   processing the downlink control information and the data, wherein the DMRS port indicator includes antenna port information, scrambling identity information, and rank information.

8. The method of claim 7, wherein the scrambling identity information indicates one of two scrambling sequences based on the rank information.

9. The method of claim 7, wherein the scrambling identity information indicates a first scrambling sequence, if the rank information indicates a rank being greater than a predetermined value.

10. The method of claim 9, wherein the predetermined value is 2.

11. The method of claim 9, the rank is a number of layers.

12. The method of claim 7, wherein the downlink control information further includes a resource assignment, a hybrid automatic repeat request (HARQ) process index, a transmit power control for a physical uplink control channel, a modulation and coding scheme, a redundancy version, and a new data indicator.

13. An apparatus for wireless communication system, the apparatus comprising:
   a transceiver for transmitting and receiving a signal; and
   a controller for controlling to generate downlink control information including a demodulation reference signal (DMRS) port indicator associated with at least one transport block, and to transmit the downlink control information and data corresponding to the downlink control information to a terminal,
   wherein the DMRS port indicator includes antenna port information, scrambling identity information, and rank information.

14. The apparatus of claim 13, wherein the scrambling identity information indicates one of two scrambling sequences based on the rank information.

15. The apparatus of claim 13, wherein the scrambling identity information indicates a first scrambling sequence, if the rank information indicates a rank being greater than a predetermined value.

16. The apparatus of claim 15, wherein the predetermined value is 2.

17. The apparatus of claim 15, the rank is a number of layers.

18. The apparatus of claim 13, wherein the downlink control information further comprises a resource assignment, a hybrid automatic repeat request (HARQ) process index, a transmit power control for a physical uplink control channel, a modulation and coding scheme, a redundancy version, and a new data indicator.

19. An apparatus for wireless communication system, the apparatus comprising:
- a transceiver for transmitting and receiving a signal; and
- a controller for controlling to receive downlink control information and data corresponding to the downlink control information and to process the downlink control information and the data, wherein the downlink control information includes a demodulation reference signal (DMRS) port indicator associated with at least one transport block,
- wherein the DMRS port indicator includes antenna port information, scrambling identity information, and rank information.

20. The apparatus of claim 19, wherein the scrambling identity information indicates one of two scrambling sequences based on the rank information.

21. The apparatus of claim 19, wherein the scrambling identity information indicates a first scrambling sequence, if the rank information indicates a rank being greater than a predetermined value.

22. The apparatus of claim 21, wherein the predetermined value is 2.

23. The apparatus of claim 21, the rank is a number of layers.

24. The apparatus of claim 19, wherein the downlink control information further comprises a resource assignment, a hybrid automatic repeat request (HARQ) process index, a transmit power control for a physical uplink control channel, a modulation and coding scheme, a redundancy version, and a new data indicator.

* * * * *